United States Patent [19]

Lauritzen

[11] 4,320,577

[45] Mar. 23, 1982

[54] AUTOMATIC READOUT MICROMETER

[75] Inventor: Ted Lauritzen, Lafayette, Calif.

[73] Assignee: The United States of America as represented by the Department of Energy, Washington, D.C.

[21] Appl. No.: 45,170

[22] Filed: Aug. 4, 1979

[51] Int. Cl.[3] ............................................. G01B 11/04
[52] U.S. Cl. ................................. 33/125 A; 33/180 R
[58] Field of Search ............. 33/125 R, 125 A, 125 C, 33/165, 161, 169 R, 286, 170, 287, 295, 1 CC, 1 MP, 1 L, 166, 182, 180, 172 E, 181, 143 L, 139, 140; 356/399–401, 383, 375

[56] References Cited

U.S. PATENT DOCUMENTS

| | | | |
|---|---|---|---|
| 672,622 | 4/1901 | Isherwood | 33/165 |
| 1,133,652 | 3/1915 | May | 33/165 |
| 2,169,533 | 8/1939 | Kasten | 33/295 |
| 2,843,938 | 7/1958 | Campbell | 33/165 X |
| 3,226,833 | 1/1966 | Lemelson | 33/163 X |
| 3,271,564 | 9/1966 | Rosenfeld | 33/140 |
| 3,272,021 | 9/1966 | Weber | 74/25 |
| 3,273,249 | 9/1966 | Klaaseen | 33/172 |
| 3,535,525 | 10/1970 | Minkowitz | 250/208 |
| 3,551,057 | 12/1970 | Hamilton et al. | 356/400 |
| 3,658,429 | 4/1972 | Zipin | 33/125 A X |
| 3,680,214 | 8/1972 | Quenot | 33/161 X |
| 3,698,817 | 10/1972 | Iimura | 356/383 X |
| 3,750,299 | 8/1973 | Plasser et al. | 104/7 R X |
| 3,755,905 | 9/1973 | Blumbaugh | 33/286 |
| 3,780,440 | 12/1973 | Taylor | 33/139 |
| 3,812,589 | 5/1974 | Schultheis | 33/139 |
| 3,816,002 | 6/1974 | Wieg | 33/125 CX |
| 3,844,047 | 10/1974 | Carson | 33/166 |
| 3,855,708 | 12/1974 | Tann | 33/169 R |
| 3,891,039 | 6/1975 | Lagerstrom | 33/1 H X |
| 3,902,810 | 9/1975 | Hamar | 356/138 |
| 4,008,523 | 2/1977 | Voros | 33/147 F X |

OTHER PUBLICATIONS

"A Precision Surveying System for PEP", by J. Gunn et al., 3/16/77, U.S. Energy Research and Development Adm.
"Spectra Physics", Laser Level & Laser Rod. by Spectra-Physics, Mountain View, Ca.

Primary Examiner—Harry N. Haroian
Attorney, Agent, or Firm—L. E. Carnahan; Richard G. Besha; James E. Denny

[57] ABSTRACT

A measuring system is disclosed for surveying and very accurately positioning objects with respect to a reference line. A principal use of this surveying system is for accurately aligning the electromagnets which direct a particle beam emitted from a particle accelerator. Prior art surveying systems require highly skilled surveyors. Prior art systems include, for example, optical surveying systems which are susceptible to operator reading errors, and celestial navigation-type surveying systems, with their inherent complexities. The present invention provides an automatic readout micrometer which can very accurately measure distances. The invention has a simplicity of operation which practically eliminates the possibilities of operator optical reading error, owning to the elimination of traditional optical alignments for making measurements. The invention has an extendable arm which carries a laser surveying target. The extendable arm can be continuously positioned over its entire length of travel by either a coarse or fine adjustment without having the fine adjustment outrun the coarse adjustment until a reference laser beam is centered on the target as indicated by a digital readout. The length of the micrometer can then be accurately and automatically read by a computer and compared with a standardized set of alignment measurements. Due to its construction, the micrometer eliminates any errors due to temperature changes when the system is operated within a standard operating temperature range.

13 Claims, 7 Drawing Figures

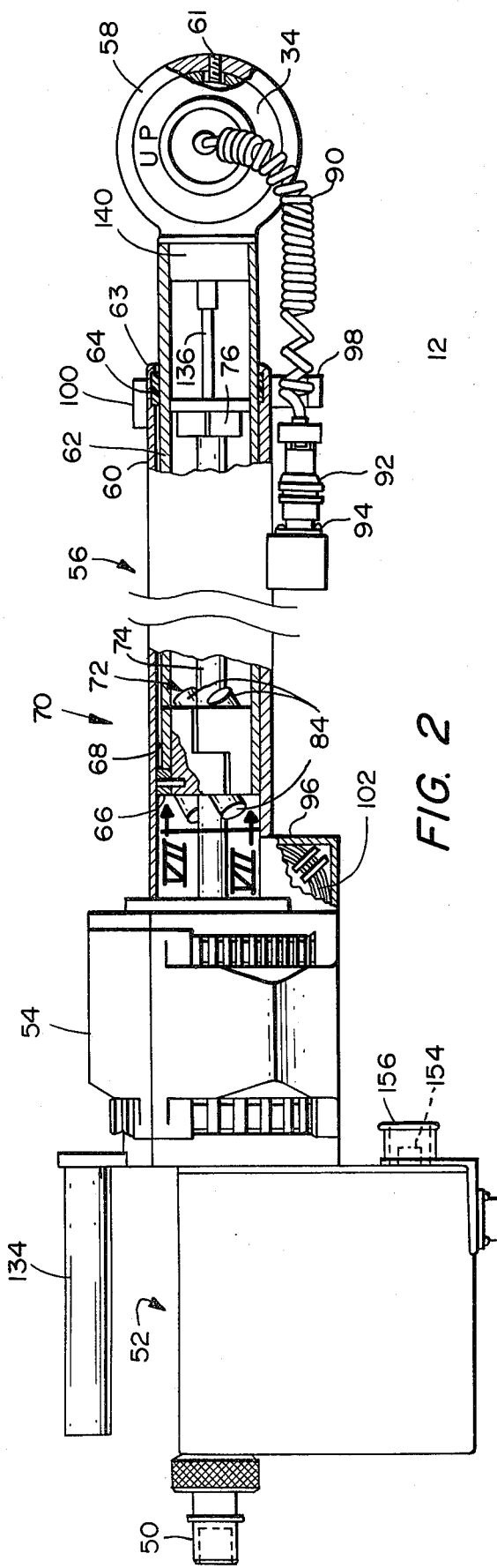
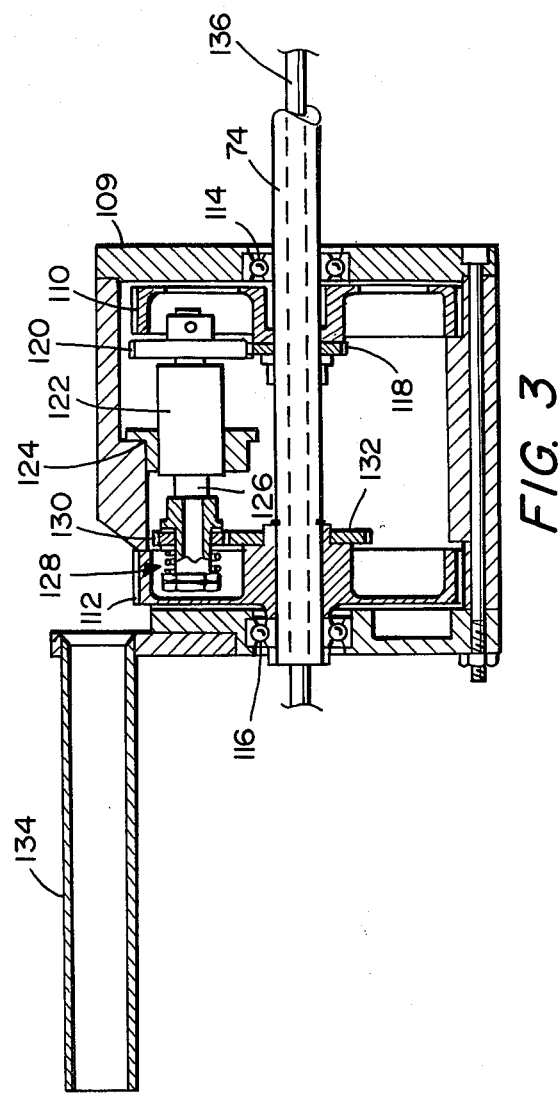
FIG. 2
FIG. 3

AUTOMATIC READOUT MICROMETER

BACKGROUND OF THE INVENTION

The invention described herein was made at Lawrence Berkeley Laboratory in the course of, or under, contract W-7405-ENG-48 between the United States Department of Energy (formerly Energy Research and Development Administration) and the University of California.

This invention relates to systems and instrumentation for surveying and in particular to systems for providing highly accurate alignment of objects with respect to a datum.

A number of systems are presently available for surveying to determine the location of chosen objects. Among these is the standard transit system which requires a certain measure of skill to operate. Even though effectively operated, a transit system is subject to error due to the optical sightings which the operator must take when making the desired measurements. Another type of surveying system comprises a celestial navigation system. Such a system is quite expensive and complex. Due to this complexity, highly trained technicians are required to operate this system.

Focusing on the instruments used in prior art systems, besides the above-indicated disadvantage associated with taking optical sightings, the readings taken by such instruments are susceptible to variations due to change in temperature. Certainly such variations become more critical with a system accuracy on the order of one-thousandth of an inch. Some instrumentation accounts for temperature variations by taking several readings which when properly combined can eliminate any variations due to said temperature; however, it would obviously be more advantageous to only take one reading while performing the survey instead of several readings to counteract this temperature variation.

Another problem associated with many of the measuring instruments and especially those which incorporate both a coarse and a fine adjustment for determining a measurement is that once a coarse adjustment is set, there is the possibility that the final measurement will not be within the range of the fine adjustment and thus after considerable measuring effort, the coarse adjustment must be reset to allow movement of the fine adjustment for making the final measurement. This is particularly true of an instrument wherein a coarse screw provides the coarse movement and a fine screw mounted in relationship to the coarse screw provides the fine measurement. If the coarse measurement is not made with some reasonable accuracy, there exists the possibility that the fine screw will not have enough run to make the final measurement. If this occurs, then the time for setting the coarse and fine screw are wasted and the coarse screw must be reset to allow the fine screw to come within the range of the final measurement.

Still another problem with some of the prior art measuring instruments is the fact that they are susceptible to backlash due to their inherent design. Backlash occurs in an instrument due to the looseness of fit of one part with respect to the other. Thus, for example, in a screw-type measuring instrument, the accuracy of the instrument can be no greater than the accuracy of the fit of the screw in the groove upon which it travels. Thus, the final reading could be at variance with the actual distance by as much as plus or minus the degree of looseness of fit.

SUMMARY OF THE INVENTION

The present invention is directed to overcoming one or more of the problems as set forth above.

In one aspect of this invention an apparatus for taking measurements is disclosed which includes first and second arms, the second arm being telescopingly secured within the first arm. A means is provided for positioning the second arm with respect to the first arm and further means is provided for measuring the change of position of the second arm with respect to the first arm.

In a further aspect of the invention one of said first and second arms is disposed about the other said arm and a measurement tape is disposed within the other said arm.

In still a further aspect of the invention the means for positioning the second arm with respect to the first arm includes impositive positioning means which allows for rapid movement of the second arm with respect to the first arm to extend the second arm quickly to the approximate length to be measured and thereafter allows for coarse and fine adjustments to be made until the final length has been measured.

In yet another aspect of the invention a system for measuring includes a laser line-of-sight reference, a fiducial point and means for determining the distance between the laser line-of-sight reference and the fiducial point. The distance determining means includes the apparatus having the first and second arms as described hereinabove with a laser target mounted to the second arm. The measuring system further includes means for comparing the measured distance with a known and desired distance.

Thus, it can be seen that the present invention is quite simple to operate in comparison to the prior art inventions. In order to make the appropriate measurements, all that is necessary is to extend the second arm with respect to the first arm until the desired length has been obtained as indicated by, for example, a null reading on the laser target readout. As the operator does not have to read a scale or form visual determinations, the chance of error associated therewith is eliminated. Also, due to the maintaining of one of the arms about the other and to the positioning of the tape inside the arms, the two arms shield the tape from variations in temperature. Thus, the tap is, for example, shielded from variations in temperature along the arms due to the hand adjustment of the arms by the operator. Further, any changes in the length of the arms themselves, due to temperature changes, will not effect the measurement, as the arms, no matter what their length is, can be extended to the appropriate distance, and the tape will measure the combined extended length of the arms.

The present invention has the additional advantage of allowing coarse and fine adjustment to be made over the entire range of distances which can be measured thereby. In addition to this, the impositive positioning means allows the second arm to be rapidly moved with respect to the first arm to the approximate desired length to be measured, and then the coarse and fine adjustments can be used to give a final measurement.

Another advantage of the impositive positioning means is the fact that it eliminates backlash which is inherent in many measuring instruments, and thus greatly increases the accuracy of the measurement.

BRIEF DESCRIPTION OF THE DRAWINGS

FIG. 2 is a side view, partially cut away which represents an embodiment of the automatic readout micrometer of the present invention.

FIG. 3 depicts an enlarged, partially sectioned view of the coarse and fine adjustment mechanism of the micrometer as depicted in FIG. 2.

DESCRIPTION OF THE PREFERRED EMBODIMENT

Figure 1:
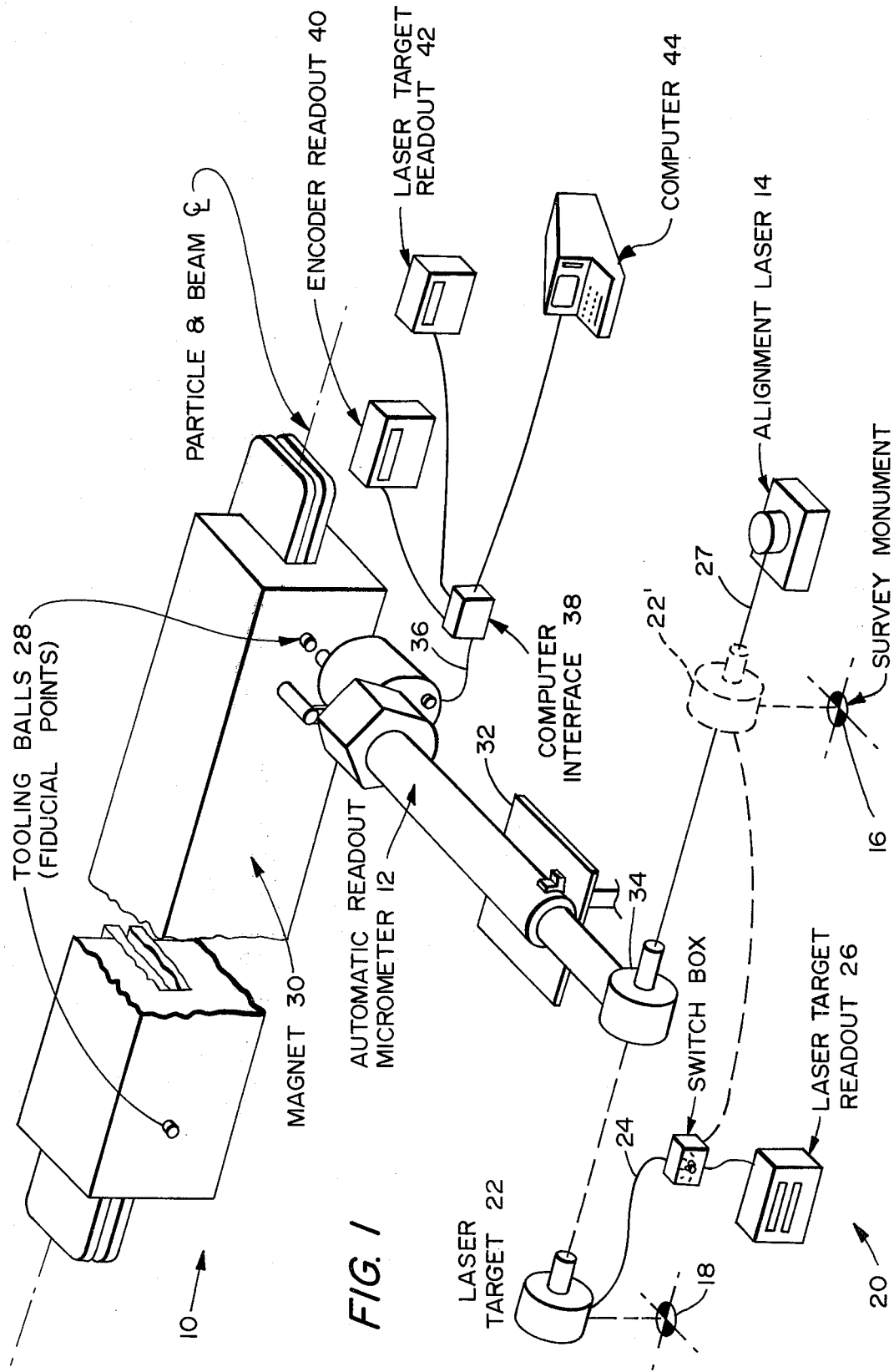
FIG. 1 is a schematically depicted perspective view of the measuring system of the invention.

Referring to the figures and in particular to FIG. 1, the surveying system of the invention is depicted and denoted by the numeral 10. The surveying system 10 includes an automatic readout micrometer which is denoted by the numeral 12 and which is depicted in a somewhat extended position. Other elements of system 10 includes the alignment laser 14 which provides a laser line-of-sight between two survey monuments 16 and 18. Assisting in the alignment of the laser with respect to the survey monuments is a laser target system 20. Laser target system 20 includes a laser target 22 which is connected by conduit 24 to a laser target readout instrument 26. Laser 14 is a standard, commercially available alignment laser, well known in the industry. Laser target 22 is a commercial unit available from Hamar Laser Instruments, Inc. of Wilton, Connecticut and described in U.S. Pat. No. 3,535,525 which is issued to Minkowitz on Oct. 20, 1970 and U.S. Pat. No. 3,902,810, which was issued to Hamer on Sept. 2, 1975. Essentially laser target 22 comprises a plurality of photo-sensitive cells which are inter-coupled in a manner to provide voltage which indicate the polarity and magnitude of the displacement of the laser target with respect to the laser beam. The laser target and the laser target readout instrument measure both horizontal and vertical displacement. It is noted that in FIG. 1 laser target 22 is shown in phantom immediately above survey monument 16 and is designated 22'. The actual alignment procedure for the laser beam will be discussed hereinbelow.

Automatic readout micrometer 12 is provided to accurately determine the distance between the laser beam 27 and fiducial points or tooling balls 28 which can be accurately affixed in a known spatial relationship with the rest of an object to be aligned, such as electromagnet 30 in FIG. 1. It is to be understood, that as electromagnet 30 is designed to guide a particle beam, that very accurate placement of electromagnet 30 is necessary.

Further viewing FIG. 1, automatic readout micrometer 12 is slidable on a stand 32 which allows free travel of the micrometer about the tooling ball 28 in a horizontal plane. Incorporated into automatic readout micrometer 12 is a laser target 34 which is substantially identical to laser target 22. A conduit 36 extends from automatic readout micrometer 12 and communicates with a computer interface 38. Coupled to computer interface 38 are encoder readout 40, laser target readout 42 and computer 44. As will be described more fully below, encoder readout 40 indicates the exact length between the fiduciary point 28 and the laser line-of-sight 27. Laser target readout 42 determines when the automatic readout micrometer 12 is correctly positioned between one of the fiduciary points 28 and the laser line-of-sight 27 so as to be perpendicular to said line-of-sight 27. Computer 44 records the measurements made by the micrometer 12, compares them with desired distances and calculates the necessary correction for proper position of the magnet 30.

Figure 6:
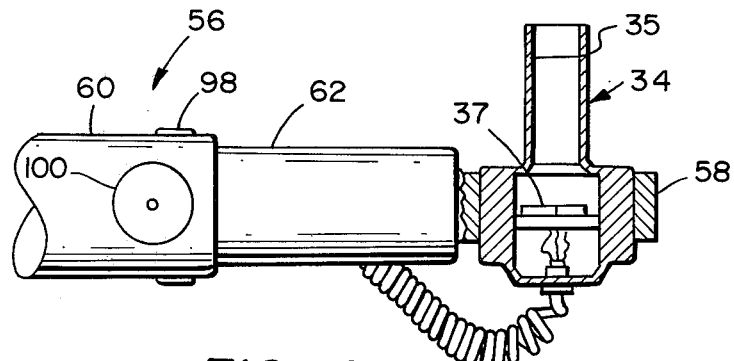
FIG. 6 depicts a top, partially sectioned view of a laser target mounted in the mount position at the end of the micrometer of FIG. 2.

Viewing FIG. 2 a side elevational view of a partially extended automatic readout micrometer 12 is depicted. Automatic readout micrometer 12 includes a tooling ball reference socket 50 which is secured to a tape/encoder assembly 52, and which encoder is secured to a gearbox assembly 54. Gearbox assembly 54 is secured to a tube assembly 56 which includes a mount 58 which precisely and accurately accepts laser target 34 which is identical to target 22. As can be seen in FIG. 2 target mount 58 includes a spring-loaded detent 61 which properly secures the target 34 in an up-position, as indicated by the word "up", and the arrow engraved into the laser target 34. Placing target 34 in the "up" position insures a consistent polarity readout. It is to be understood that the tolerance between the inner diameter of the laser target mount 58 (FIG. 6) and the laser target 34 is quite small so that once the laser target is mounted into mount 58, there is no instrumentally perceivable lateral movement of the target with respect to the mount. As can be seen in FIG. 6, target 34 includes a channel 35 through which light must travel before striking photosensitive cells 37.

Tube assembly 56 comprises an outer tube 60 concentrically mounted about an inner tube 62. A plurality of sleeve bearings 64 are embedded into the inner diametrical surface of the outer tube 60. These sleeve bearings allow the inner tube 62 to telescope with respect to the outer tube 60 while still maintaining the correct alignment between the two tubes. In a preferred embodiment the sleeve bearings are comprised of Rulon ® which is a Teflon ® and glass material. Further, the inner and outer tubes are comprised of anodized aluminum in a preferred embodiment.

Secured to inner tube 62 is a key 66 which rides in a keyway 68 machined in the inner surface of the outer tube along a line parallel to the longitudinal axis of the tube assembly 56. Key 66 and keyway 68 prevent the inner tube from turning with respect to the outer tube as the inner tube is extended with respect thereto. Thus, the laser target 34 will not pitch with respect to the laser line-of-sight.

Mounted in the internal tube 62 is a linear actuator assembly or impositive drive means 70 which can telescope the inner tube with respect to the outer tube by converting rotary motion into linear motion. Linear actuator assembly 70 includes a threadless nut assembly 72 which is fixedly secured to the end of inner tube 62. Threadless nut assembly 72 is mounted on a hollow drive shaft 74, the longitudinal axis of which is coincident with the longitudinal axis of the inner tube 62. Drive shaft 74 is secured in operative association with gearbox assembly 54 at one end thereof and is mounted to a shaft collar 76 at the other end thereof. In a preferred embodiment, collar 76 is comprised of Teflon ®. Shaft collar 76 slides and rotates on the inner surface of inner tube 62 as said inner tube is telescoped with respect to the outer tube.

Figure 7:
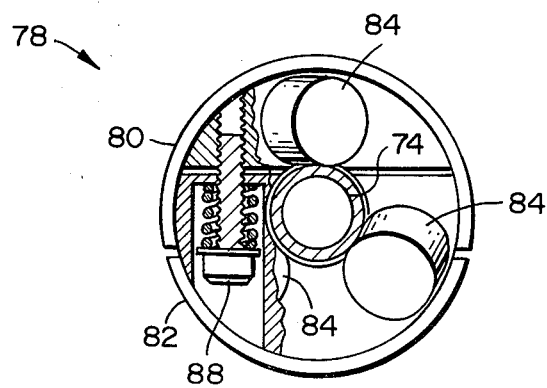
FIG. 7 depicts a partially sectioned end view of the impositive positioning mechanism which is taken along line VII—VII in FIG. 2.

Examining the threadless nut assembly 72, and viewing FIGS. 2 and 7, it can be seen that said assembly is comprised of a split housing 78 having two sections 80 and 82. Mounted at each end of the housing are three roller bearings 84, the axis of rotation of which is skewed with respect to the axis of rotation of the drive shaft 74. Housing 78 is resiliently mounted about drive shaft 74 by two adjustable springs, one of which is designated 88, so that the roller bearings 84 are held against the drive shaft 74 with a preset amount of force. As drive shaft 74 rotates, such rotational motion is turned into linear motion as the threadless nut rolls on the shaft due to the skewed arrangement of the roller bearings 84. Further, after frictional resistance is overcome, the threadless nut can be slid over the shaft, allowing the inner tube to be quickly pulled out of or pushed into the outer tube by the operator to approximate the desired length to be measured. Also, due to the construction of threadless nut 72, backlash or undesirable play in the micrometer is reduced to a tolerable level. A full discussion of the linear actuator assembly 70 can be obtained from a review of U.S. Pat. No. 3,272,021 which issued to Weber on Sept. 13, 1966. Further, such devices are commercially available under the name of Roh'lix ®, from the Barry Wright Corporation.

Again viewing FIG. 2, it can be seen that a coiled lead 90 extends from the laser target 34 and has a female connector 92 of the type well known in the industry attached to the free end thereof. Secured to the outer tube 60 is a male connector 94 which accepts female connector 92. The signals from the laser targer 34 are sent through the coiled lead 90 and the connectors 92 and 94, through leads 102 which are embedded in the outer tube 60 and to a junction box 96 which is secured to the gearbox assembly 54. The coiled lead allows the inner tube to extend outwardly from the outer tube to its fullest extent.

Mounted to the outer tube adjacent the free end 63 thereof is an elevation foot 98. As will be described hereinbelow elevation foot 98 rests on stand 32 and allows the micrometer to be slid across the stand 32 during the operation of the survey system 10. A bubble level 100 is mounted on top of the outer tube 60 and is used to determine when the micrometer is level with respect to the fixed fudicial point 28.

FIG. 3 represents a cross-sectional view of the gearbox assembly 54 of FIG. 2. It is noted that the gearbox assembly has a fine adjustment thumb wheel 110 and a coarse adjustment thumb wheel 112. Both of these thumb wheels are concentrically mounted about the previously mentioned drive shaft 74 which extends through the gearbox assembly 54 and is rotatably mounted with respect thereto by roller bearings 114 and 116. Fine adjustment thumb wheel 110 is rotatably mounted on housing 109 of gearbox assembly 54 such that it can freely rotate about the drive shaft 74. Secured to thumb wheel 110 is a gear 118. Gear 118 is engaged by a second gear 120 which is mounted to a planetary reducer gear assembly 122. Planetary reducer gear assembly 122 is mounted to the housing 109 by mount 124. Secured to planetary reducing gear assembly 122 is a shaft 126 which is connected to a conventional slip clutch 128. Secured to slip clutch 128 is a third gear 130 which engages a fourth gear 132, which fourth gear is secured to the coarse adjustment thumb wheel 112. As can be seen in FIG. 3, the coarse adjustment thumb wheel 112 is secured to the drive shaft 74. Gearbox assembly 54 is designed, in a preferred embodiment, such that the fine adjustment thumb wheel 110 must be rotated through twenty-three revolutions before it turns the coarse adjustment thumb wheel 112 and thus the drive shaft 74 through one complete revolution. With such an arrangement, the inner tube of the tube assembly can be quite accurately positioned with respect to the outer tube. In a preferred embodiment, this gearbox assembly 54 in conjunction with the other components of the micrometer 12 allows measurements to be made having a resolution of 0.0004 inches with an accuracy of 0.0005 inches.

As can be seen in FIGS. 2 and 3 a handle 134 is secured to the gearbox assembly 54. Handle 134 provides a convenient way to pick up the end of the automatic readout micrometer 12 adjacent the gearbox 54.

Figure 4:
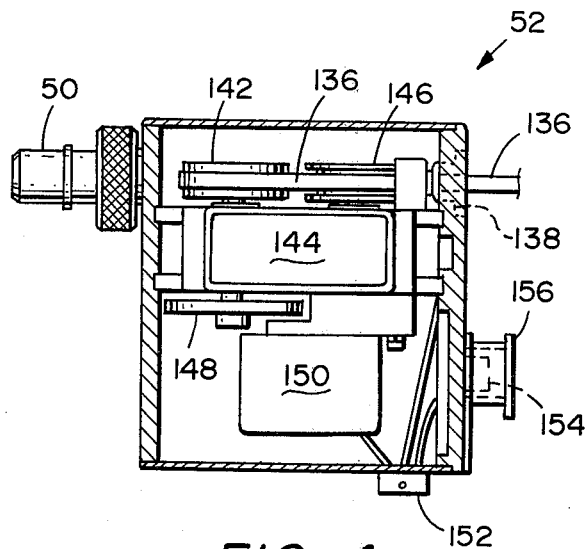
FIG. 4 depicts an upwardly skewed side, and partially sectioned, view of the distance encoder of the micrometer of FIG. 2.
Figure 5:
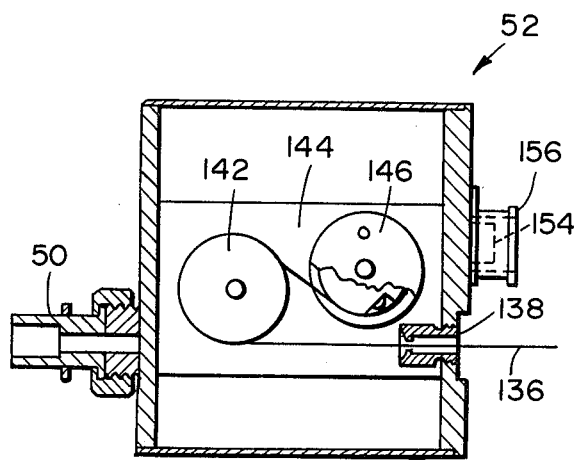
FIG. 5 depicts a partially sectioned top view of the distance encoder of FIG. 4.

Turning to FIGS. 4 and 5, views of the internal structure of the tape/encoder assembly 52 are depicted. Tape/encoder assembly 52 includes a flexible tape 136, which in a preferred embodiment comprises stainless steel. Tape 136 exits the encoder assembly 52 through a port 138 which provides access to the interior of drive shaft 74. Tape 136 extends from the tape/encoder assembly 52 along and through the entire length of hollow drive shaft 74 and is connected to a plug 140 provided at the end of the inner tube 62 immediately adjacent the point of attachment of target mount 58 to the inner tube.

In the tape/encoder assembly 52, tape 136 engages a rotary gauge block 142 which is rotatably mounted to a subassembly 144 of the encoder assembly 52. Tape 136 is in nonslip contact with gauge block 142 and thus any movement of tape 136 causes gauge block 142 to rotate. Also rotatably mounted to sub-assembly 144 is a storage drum 146 which stores the excess of length of the stainless steel tape 136 when the inner tube 62 is not fully extended with respect to the outer tube 60 of the micrometer 12. Sub-assembly 144 also includes an antibacklash gear 148 which reduces the backlash and increases the accuracy of the system and also a negator drum spring and pulley assembly (not shown) which applies a constant tension to the tape to keep it taut at all times. An optical encoder 150 is mounted to the sub-assembly 144 and is operatively associated with rotary gauge block 142 rotates. Optical encoder 150 senses the position of rotary gauge block 142 and provides an electronic signal to computer 44 through one of the conductors in conduit 36. As can be seen in FIG. 1, conductor 36 is secured to the outer housing of the tape/encoder assembly 52 by a connector 152 (FIG. 2). It is noted that the conduits from the optical encoder 150 and also from the laser target 34 which are directed from the tube assembly 56, through the gearbox assembly 54, and to the tape/encoder assembly 52 are also connected to the conduit 36 through the connector 152.

The tape/encoder assembly 52 is more fully described in U.S. Pat. No. 3,780,440 issued to James L. Taylor on Dec. 25, 1973. Further such units are commercially available from Ideal Aerosmith Inc., of Cheyenne, Wyoming.

Mounted on the external surface of the housing of tape/encoder assembly 52 is a push button switch 154 which is protected by a cylindrical collar 156. Push button switch 154 controls the entry of data into the computer 44. As will be discussed hereinbelow in the industrial applicability of the invention, when a proper length is measured, as indicated by the laser target readout 42, pushbutton switch 154 is depressed to instruct the computer to record the measured length between the fiduciary point 28 and the laser line-of-sight 27.

INDUSTRIAL APPLICABILITY

The operation of the survey system 10 which includes the automatic readout micrometer 12 is as follows. A standard (not shown), which has a tooling ball and a holder for the laser target mount of the automatic readout micrometer, is used to determine a standard length for the micrometer 12. This standard length is known quite accurately and is fed into the computer and the encoder readout instrument 40 as a reference length, all other lengths being measured from this reference length.

After the reference length is determined, the laser beam line-of-sight is set up. This line-of-sight is established by mounting laser target 22 over survey monuments 18 with an optical plummet (not shown). The laser beam is then aligned with the survey monument 16 and with the laser target 22 which is provided above survey monument 18. Once the laser beam is centered on the laser target, which centering is indicated by appropriate null readings on the horizontal axis readout of the laser target readout instrument 26 (due to an optical balancing of the light striking the photosensitive cells of the laser target), the laser target is positioned above monument 16 with the optical plummet. The laser beam is then realigned with the newly positioned laser target. The laser target 22 is moved from survey monument to survey monument until the laser beam is exactly aligned or "bucked in" over the two said survey monuments. Next, the stand 32 is positioned between the fiduciary point 28 and the laser line-of-sight 27. The tooling ball reference of the automatic readout micrometer 12 is then mounted on a tooling ball or fiducial point 28 of the magnet 30. The elevation foot 98 of the micrometer 12 is then rested on the stand and the stand is adjusted vertically upwardly or downwardly until the level balance 100 indicates that the micrometer is level with respect to the tooling ball 28. With the micrometer 12 so positioned, the operator grabs the target mount 58 and pulls the inner tube telescopingly outwardly from the outer tube until the laser target 34 is approximately in the line-of-sight of the laser beam.

Once the inner tube has been approximately positioned, the fine and coarse adjustment thumb wheels 110 and 112 can be turned to more accurately position the laser target with respect to the beam. It is to be understood that, if desired, the micrometer can be telescoped through its entire range by using either the course thumb wheel, or the fine thumb wheel, or by pulling the tubes apart or by any combination of the above. Thus, the fine thumb wheel never outruns the setting of the course thumb wheel. The automatic readout micrometer 12 is pivoted about the tooling ball in the plane of the stand such that the bubble balance of the micrometer always indicates that the micrometer is level. The pivoting micrometer 12 causes the laser target 34 to describe an arc which can (i) cut the laser line-of-sight at two points if the length of the extended micrometer 12 is greater than the perpendicular distance between the tooling ball and the laser line-of-sight and thereby resulting in two null readings on the laser target readout as the micrometer 12 is pivoted, (ii) be tangent to the line-of-sight if the extended micrometer is exactly the above perpendicular distance and thereby resulting in only one null reading on the laser target readout, and (iii) not cut the laser line-of-sight if the length of the micrometer is less than the perpendicular distance and thereby resulting in no null readings. It is to be understood that owing to the design of the laser target readout and the laser target, a positive readout is given when the laser target is positioned between the laser line-of-sight and the fiduciary point and a negative readout is given when the laser target is on the other side of the laser line-of-sight. This polarity aids the operator in determining whether the micrometer must be lengthened or shortened in order to give the final proper length. The magnitude of the readout helps the operator determine the amount by which the micrometer must be lengthened or shortened. Once the proper length has been determined, the pushbutton switch 154 of the micrometer 12 is depressed feeding the exact distance between the fiducial point and the laser line-of-sight into the computer.

The above-indicated pivoting technique is a standard one known to all surveyors. In optical surveying a level is sighted on a rod which is used to indicate the elevation of the line-of-sight of the level of both the ground. The rod is then pivoted back and forth, the lowest reading on the level being the perpendicular distance between the ground upon which the rod is set and the line of sight of the level.

The actual length of the now extended automatic readout micrometer 12 which is fed into the computer is measured in the following way. As the inner tube is extended, the tape which is secured to the inner tube is also extended. As the tape extends, it causes the rotary gauge block 142 of the tape/encoder assembly to rotate. The encoder 150 measures this rotation and adjusts the standard preset reading on the micrometer readout instrument accordingly. If the tape is extracted from the tape/encoder assembly, the length as provided by the readout increases. If the tape is retracted into the tape/encoder assembly 52 upon the withdrawal of the inner tube into the outer tube, the standard length as recorded on the encoder readout is reduced by the amount which the tape is retracted into the encoder assembly.

Again when it is determined that the micrometer is set at the exact length to be measured, the pushbutton switch 154 is depressed to record that measurement in the computer. Other measurements are made in the same, above-indicated manner and then the computer compares the measurements with the desired positions of the magnets and indicates the correction that must be made to properly align the magnet.

Micrometer 12 is capable of operating at room ambient temperatures in the range of 60° F. to 90° F. (15° C. to 32° C.) without any special consideration. This is due in part to the fact that the tape 136 from encoder assembly 54 is shielded from temperature variations by hollow shaft 74, inner tube 62 and outer tube 60, and also to the construction of the encoder assembly 54 itself. Thus, with the tape so shielded temperature variations, especially in the outer tube, caused, for example, by the operator handling micrometer 12, do not reach the tape. The temperature range can be broadened to a range of 40° F. to 110° F. (5° C. to 43° C.). However, outside the 60° F. to 90° F. range, the system 10 must reach the ambient temperature condition before measurements are started. To reduce any possible temperature effect in the measurements, the micrometer can be recalibrated with the standard before each measurement.

Other aspects, objects and advantages of this invention can be obtained from a study of the drawings, the disclosure and the appended claims.

What is claimed is:

1. An apparatus for taking measurements including:
    a first arm;
    a second arm;
    means for mounting the second arm telescopingly to the first arm;
    means for impositively positioning the second arm with respect to the first arm wherein said impositively positioning means includes means including a threadless nut assembly for slipping varying the position of said second arm with respect to said first arm and means including coarse and fine adjustment means for rollingly varying the position of said second arm with respect to said first arm; and
    means for electronically measuring the change in position of the second arm with respect to said first arm.

2. The apparatus of claim 1, wherein the coarse and fine adjustment means includes a pair of adjustment wheels for accurately positioning the second arm with respect to the first arm by either and both a relatively fine adjustment and a relatively coarse adjustment along the entire length of travel of the second arm with respect to the first arm.

3. The apparatus of claim 1 wherein the second arm has a target mount.

4. The apparatus of claim 1 wherein one of said arms is mounted concentrically about the other of said arms and wherein said measuring means includes a tape connected to both arms and wherein said concentric arms are positioned about said tape.

5. An apparatus for taking measurements including:
    a first arm;
    a second arm;
    means for mounting the second arm to the first arm;
    means for positioning the second arm with respect to the first arm;
    means for electronically measuring the change in position of the second arm with respect to said first arm;
    wherein one of said arms is mounted concentrically about the other of said arms;
    wherein said measuring means includes a tape connected to both said arms;
    wherein said positioning means includes a hollow shaft; and
    wherein said concentric arms are positioned about said shaft and said tape is positioned through said shaft.

6. An apparatus for taking measurements including:
    a first arm;
    a second arm;
    means for mounting the second arm telescopingly to the first arm wherein the second arm can be positioned with respect to the first arm;
    means for electronically measuring the change in position of the second arm with respect to the first arm, which means include a tape which is operationally associated with each said arm, and
    wherein one of said first and second arms is disposed about the other said arm and wherein said other arm defines a channel, the apparatus further including a means for positioning said second arm with respect to said first arm, wherein at least a portion of said positioning means is positioned in said channel and wherein said positioning means defines a channel wherein a position of said tape is received in said channel of said positioning means.

7. The apparatus of claim 6 wherein said second arm has a mount adapted to receive a means for reference alignment.

8. The apparatus of claim 6 wherein the means for measuring the change in position of the second arm with respect to the first arm further includes:
    means for securing said tape to one of said arms;
    means for retrieving said tape;
    means for securing said retrieval means to the other of said arms; and
    means for sensing the position of said retrieval means.

9. The apparatus of claim 8 wherein said retrieval means includes a drum rotatably mounted to one of said arms and said sensing means senses the angular position of said drum.

10. The apparatus of claim 9 wherein said sensing means includes an optical encoder.

11. The apparatus of claim 6 including means for positioning the second arm with respect to the first arm.

12. A measurement system including a laser means for emitting a laser beam, a fiducial point and means for determining the distance between the laser beam and fiducial point, which means includes:
    a first arm;
    a second arm;
    means for mounting the second arm telescopingly to the first arm;
    means for impositively positioning the second arm with respect to the first arm wherein said impositively positioning means includes means for slippingly varying the position of said second arm with respect to said first arm and means including coarse and fine adjustment means for rollingly varying the position of said second arm with respect to said first arm;
    means for electronically measuring the change of position of the second arm with respect to their first arm including a tape operatively associated with each of said arms;
    a laser beam-sensing target mounted to one of said arms;
    means for displaying and recording the measured change of position of the second arm; and
    means for comparing the measurement with a datum.

13. The apparatus of claim 12 wherein the means for measuring the change of position of the second arm with respect to the first arm includes:
    said tape;
    means for securing said tape to one of said arms;
    means for retrieving said tape;
    means for securing said retrieval means to the other of said arms; and
    means for sensing the position of said retrieval means.

* * * * *